United States Patent [19]

Neuman et al.

[11] Patent Number: 4,755,290
[45] Date of Patent: Jul. 5, 1988

[54] APPARATUS FOR CONTINUOUSLY FILTERING PLASTIC MELT WITH NONINTERRUPTIVE PURGE

[76] Inventors: Clayton L. Neuman, 11440 Olive St., Coon Rapids, Minn. 55433; Donald J. Reum, 330 Sixth St., Albany, Minn. 56307

[21] Appl. No.: 930,734

[22] Filed: Nov. 13, 1986

[51] Int. Cl.⁴ .................. B01D 29/38; B01D 35/12
[52] U.S. Cl. .................. 210/138; 210/333.1; 210/412; 210/414; 210/489; 425/199
[58] Field of Search ............ 210/138, 142, 107, 108, 210/333.1, 335, 337, 411, 412, 413, 414, 427, 489, 317; 425/197, 198, 199

[56] References Cited

U.S. PATENT DOCUMENTS

| | | | |
|---|---|---|---|
| 1,585,817 | 5/1926 | Bailey et al. | 210/411 |
| 2,310,587 | 2/1943 | MacNeill | 210/411 |
| 2,603,667 | 7/1952 | Pankratz et al. | 210/138 |
| 3,392,839 | 7/1968 | D'Apery Mills | 210/489 |
| 4,019,987 | 4/1977 | Krasnow | 425/199 |
| 4,257,901 | 3/1981 | Rapp | 210/138 |
| 4,486,304 | 12/1984 | Neuman et al. | 210/108 |

Primary Examiner—Richard V. Fisher
Assistant Examiner—Linda S. Evans
Attorney, Agent, or Firm—Merchant, Gould, Smith, Edell, Welter & Schmidt

[57] ABSTRACT

Apparatus for continuously filtering a flow of melted plastic which includes means for purging the filter without interrupting continuous operation. A filter assembly consists of a trap plate and breaker plate between which filters are disposed. The trap and breaker plates each defines triangularly shaped openings diposed in a circular array, each of which is subdivided into smaller passages for filtering larger contaminants. Individual filters also of triangular configuration are sandwiched between registering openings between the trap and breaker plates, each filter consisting of a fine and coarse screen. A collector head is rotatably disposed for selective registration with each of the openings of the trap plate, and an indexing mechanism is included for stepping the collector head for stationary registration with each opening. The collector head communicates with a contaminant discharge passage that is open and closed in timed sequence with movement of the collector head. When the contaminant discharge passage is opened, a part of the filtered plastic downstream of the filter assembly reverses its flow through the opening registering with the collector head, purging the filter screens by carrying collected contaminants. The contaminant-filled flow initially passes into a purge chamber of predetermined volume having a pressurized piston. After a predetermined volume has entered the chamber forcing the piston to retract, a valve breaks communication between the discharge passage and purge chamber, simultaneously establishing communication between the purge chamber and a contaminant discharge outlet, enabling the piston to evacuate the purge chamber and discharge the contaminants.

24 Claims, 6 Drawing Sheets

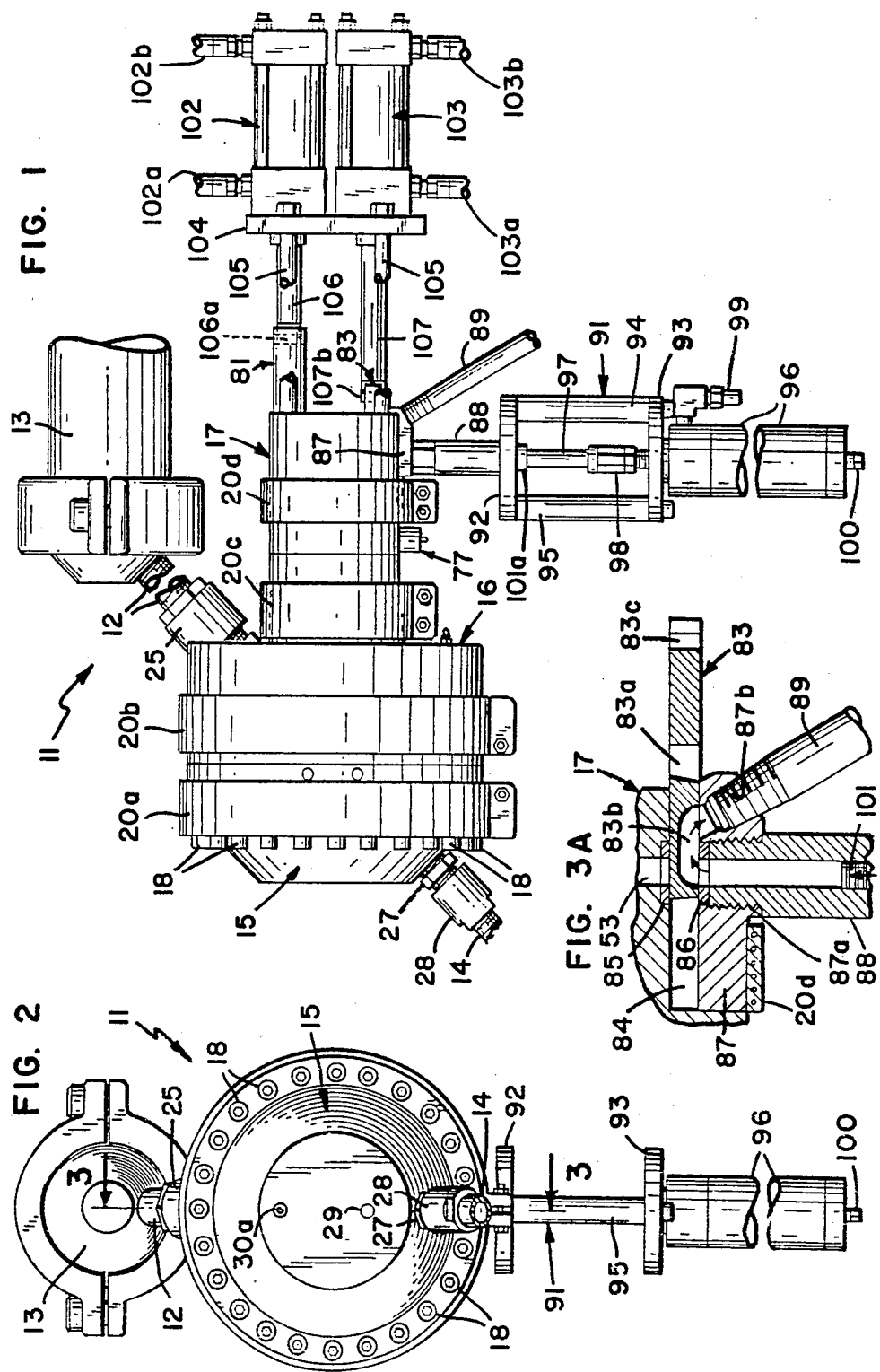

FIG. 6
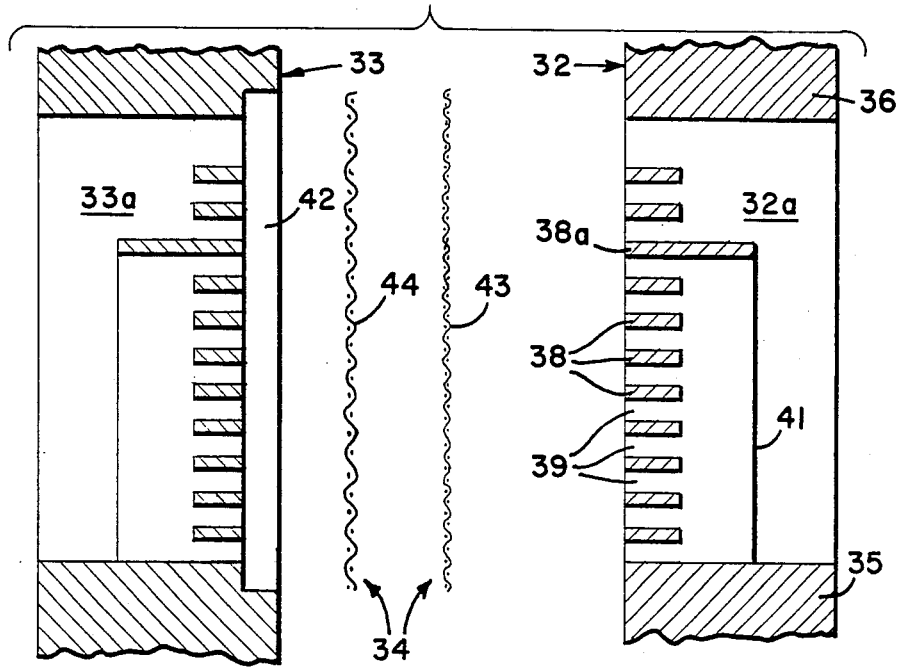
FIG. 7     FIG. 8
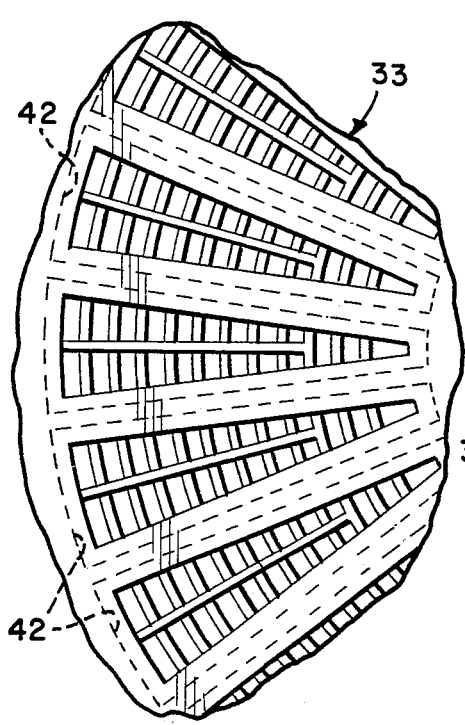 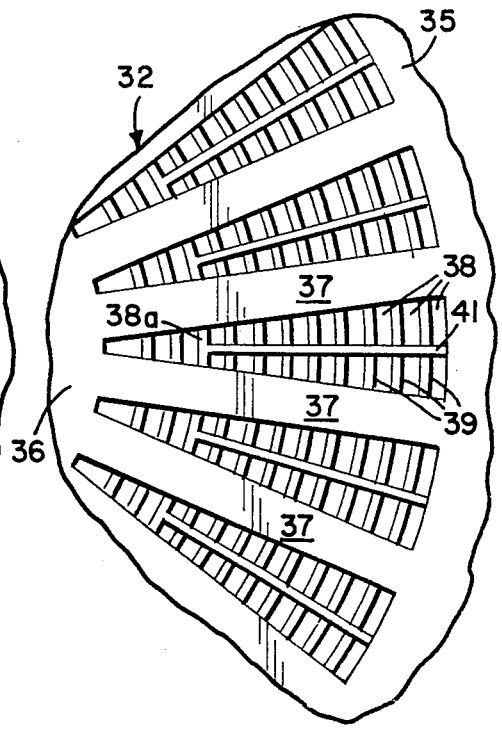

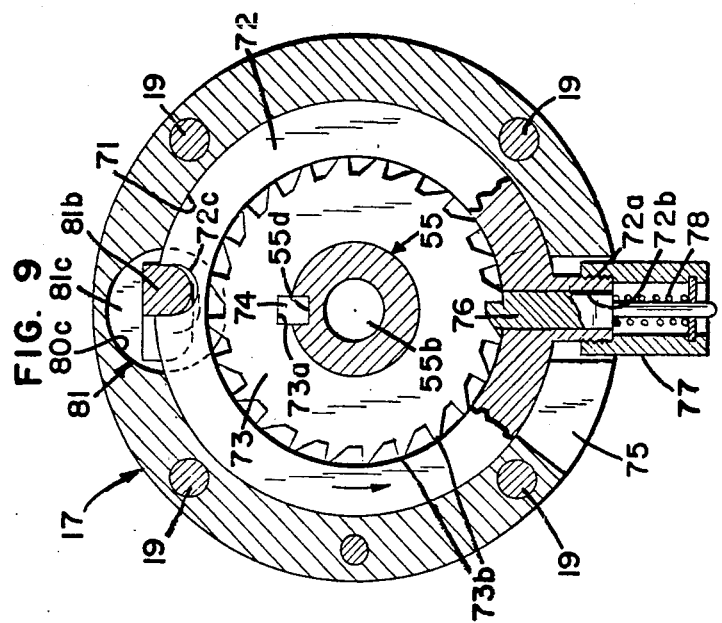
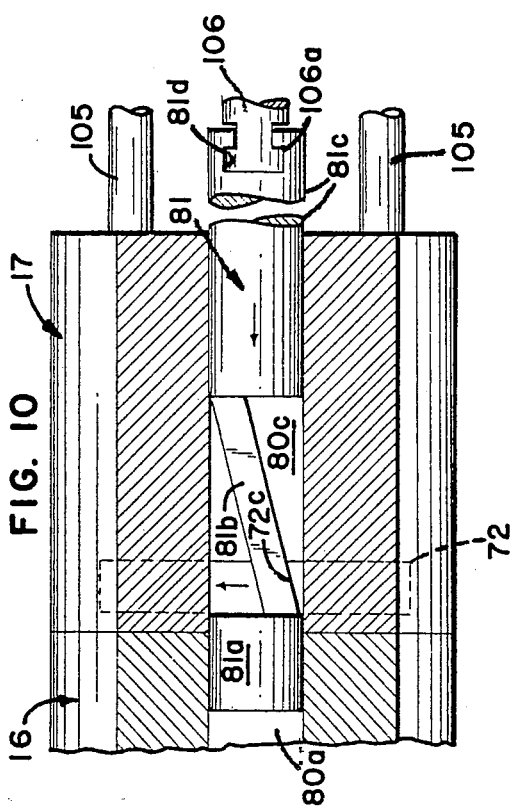
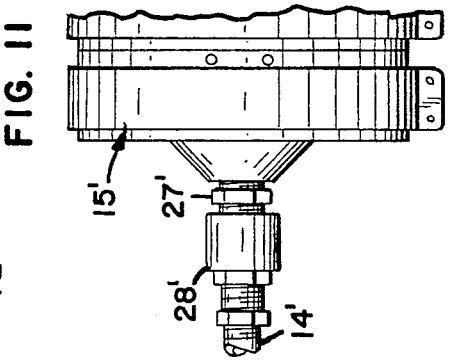

4,755,290

APPARATUS FOR CONTINUOUSLY FILTERING PLASTIC MELT WITH NONINTERRUPTIVE PURGE

The invention relates generally to filtering apparatus, and is specifically directed to apparatus for continuously filtering a flow of melted plastic including a plurality of segmented filter screens that are selectively purged without interrupting the continuous filtering operation.

The invention is an improvement to our prior U.S. Pat. No. 4,486,304, which issued on Dec. 4, 1984.

BACKGROUND OF THE INVENTION

It is common to filter a flow of melted plastic in the high pressure line leading to an extrusion die to insure high quality of the resulting plastic products and to safeguard sensitively sized openings from plugging downstream.

Melted plastic represents a unique problem insofar that standard fluid filtering techniques are concerned by virtue of its substantial viscosity, the high temperatures at which plastic must be maintained, the narrow range of temperatures in the elevated temperature range in which plastic must be maintained to insure satisfactory flow without high temperature degradation, the extremely high pressures under which plastic is subjected to cause the flow, and the need for a homogeneous flow that not only is devoid of contaminants but of air and other gases as well.

Some of these problems are insubstantial where prime virgin plastic is used in the production run, but they are compounded for plastic when plastic trim, rejects and start-up/shut-down scrap is reground and rerun again.

Recycled plastic represents a valuable resource if it can be filtered or cleaned sufficiently before extrusion. Its quality can be greatly enhanced if it is carefully filtered to remove all of the contaminants associated with recycled materials, which include degradations of the plastic itself and all types of sizes of nonplastic particulate matter. Recycled plastic, however, creates a particularly significant problem because of the size and volume of contaminants to be removed, and the need for frequent purging of the filtering means.

Many plastic filtration devices filter efficiently, but purging requires disassembly of the unit and significant downtime while the filter screen is cleaned or replaced. In the case of recycled plastic, where the contaminants are considerable, filtering apparatus without some type of intermittently operating purge mechanism cannot effectively be used.

Other types of plastic filters include purge mechanisms, but they are usually either of insufficient capability to handle the contaminants filtered from recycled plastic, or the purge itself involves a significant waste of material during the purging process. For example, it is known to use a portion of the filtered material as a reverse flow through the filter to dislodge contaminants, but the flow of filtered plastic required for the purge is either substantial, or, if a lesser volume, insufficient to accomplish the purge.

In all cases involving the purge of filtering apparatus from melted plastic, it is essential to either avoid the entry of air or other gases into the flow or to run the plastic a period of time after the purge is completed to avoid the presence of air bubbles in the product, which makes it unacceptable.

U.S. Pat. No. 4,486,304 solves a number of these problems in filtering apparatus in which the filtering occurs continuously, but in which a purged cycle can be initiated periodically or continuously, depending on the requirements of the type of plastic used. Reference is made to U.S. Pat. No. 4,486,304 for a specific description of structure and operation of the inventive filtering apparatus. Generally speaking, it employs a conventional filter screen sandwiched between breaker plates having a substantial plurality of openings larger than the filtration openings of the screen. A collector plate having a plurality of triangularly shaped passages is disposed on the upstream side adjacent one of the breaker plates. Each one of the triangular passages creates a triangular pocket for collecting contaminants that cannot pass through the filter screen.

A rotatable collector head is disposed in engagement with the collector plate immediately upstream, including a generally triangular mouth that overlies the triangular collector pocket. The collector head is rotatable for selective registration with any of the collector pockets.

The collector head is in continuous communication with a contaminant discharge passage, and valve means are included to either block or open the discharge passage. With the discharge passage closed, it is subjected to static pressure and unable to receive any flow of plastic. With the valve open, a substantial pressure differential exists between the outlet chamber of the filter apparatus and ambient pressure, resulting in a reverse flow of filtered plastic through the filter screen, collector head and contaminant discharge passage. It is this reverse flow that releases the contaminants from the screen and carries them out for discharge.

In our prior invention, the valve means for the contaminant discharge passage is timed in cooperation with means for rotatably indexing the collector head with each of the collector pockets. With the collector head disposed in registration with a collector pocket and associated filter screen, the discharge passage is opened for a period of brief duration during which reverse purge flow is caused. The valve means then closes the discharge passage as stepped indexing of the collector head begins, and upon registration of the collector head with the next adjacent triangular pocket, the valve means is again actuated to effect reverse purge flow through this newly aligned pocket. The sequence continues until each pocket has been freed of all contaminants.

This invention includes a number of improvements over the apparatus of U.S. Pat. No. 4,486,304. Included is an improved filter assembly which in turn includes improved trap and breaker plates and segmented filter screen assemblies. The trap plate is formed with a plurality of deep, generally triangular pockets arranged in a circular array. A plurality of thin bars are integrally formed in each pocket to define passages therebetween for removing larger contaminants. These bars are disposed immediately adjacent the filter screen assembly.

The breaker plate is of similar construction, but the triangular pockets face downstream whereas the triangular pockets of the trap plate face upstream. The trap and breaker plates are mounted face-to-face with the triangular pockets in axial registration.

Generally triangular recesses are formed between the trap and breaker plates in registration with the triangular pockets to receive segmented, generally triangular filter screen assemblies. These triangular recesses may be formed in either or both the trap and breaker plates.

Each of the filter screen assemblies comprises a fine upstream filter screen and a coarser downstream filter screen. The fine screen is preferably of Dutch weave construction with a fine mesh that filters smaller contaminants on its upstream surface without permitting them to become embedded. The coarser screen provides a backing support to the fine screen during the filtering process. Equally as important, the coarser screen permits lateral flow within its mesh which not only permits a smooth outlet flow through the breaker plate as the plastic seeks its way around the thin bars of the triangular pockets, but also in the reverse purge direction evenly distributes the filtered plastic over the entire surface of the fine screen to insure that all contaminants are lifted from the fine screen during the purge process.

To insure that the reverse purge flow of filtered plastic is not excessive, an improved discharge apparatus is included that causes each pulse of contaminant-filled purge flow to enter a discharge chamber against a predetermined pressure. When a predetermined volume of contaminant-filled plastic has entered this chamber, the contaminant discharge passage is blocked off, and the slug of contaminant filled plastic is then exhausted through a discharge pipe to atmosphere.

In the preferred embodiment, a plurality of pulses of reverse flow are caused through each of the segmented filter screen assemblies to insure that all contaminants are removed.

The purging operation is cycled on a continuous basis to avoid excessive clogging of the individual filter screen assemblies. This preventive maintenance permits the filtering apparatus to operate at optimum efficiency of a continuous basis, and results in extended wear life of the filter screen assemblies. Further, this improved operation is accomplished with a minimized volume of purge flow.

Other improvements and advantages will be appreciated from the attendant specification and drawings.

BRIEF DESCRIPTION OF THE DRAWINGS

FIG. 1 is a view in side elevation of a filtering apparatus embodying the invention with portions thereof broken away;

FIG. 2 is an end view of the filtering apparatus;

FIG. 3A is a partial fragmentary sectional view of the outlet portion of the filtering apparatus similar to FIG. 3 but in a second operative state;

FIG. 6 is a further enlarged fragmentary sectional view of the trapper and breaker plates shown in opposed relation with the segmented filter screens therebetween and with the components in exploded relation;

FIG. 7 is a further enlarged fragmentary end view of the breaker plate as viewed from the external face thereof;

FIG. 8 is a further enlarged fragmentary end view of the trapper plate as viewed from the external face thereof;

FIG. 9 is an enlarged sectional view taken along the line 9—9 of FIG. 3;

FIG. 10 is an enlarged fragmentary sectional view taken along the line 10—10 of FIG. 3;

FIG. 11 is a fragmentary view in side elevation of an alternative embodiment of the filtering apparatus;

DETAILED DESCRIPTION OF THE PREFERRED EMBODIMENTS

Figure 3:
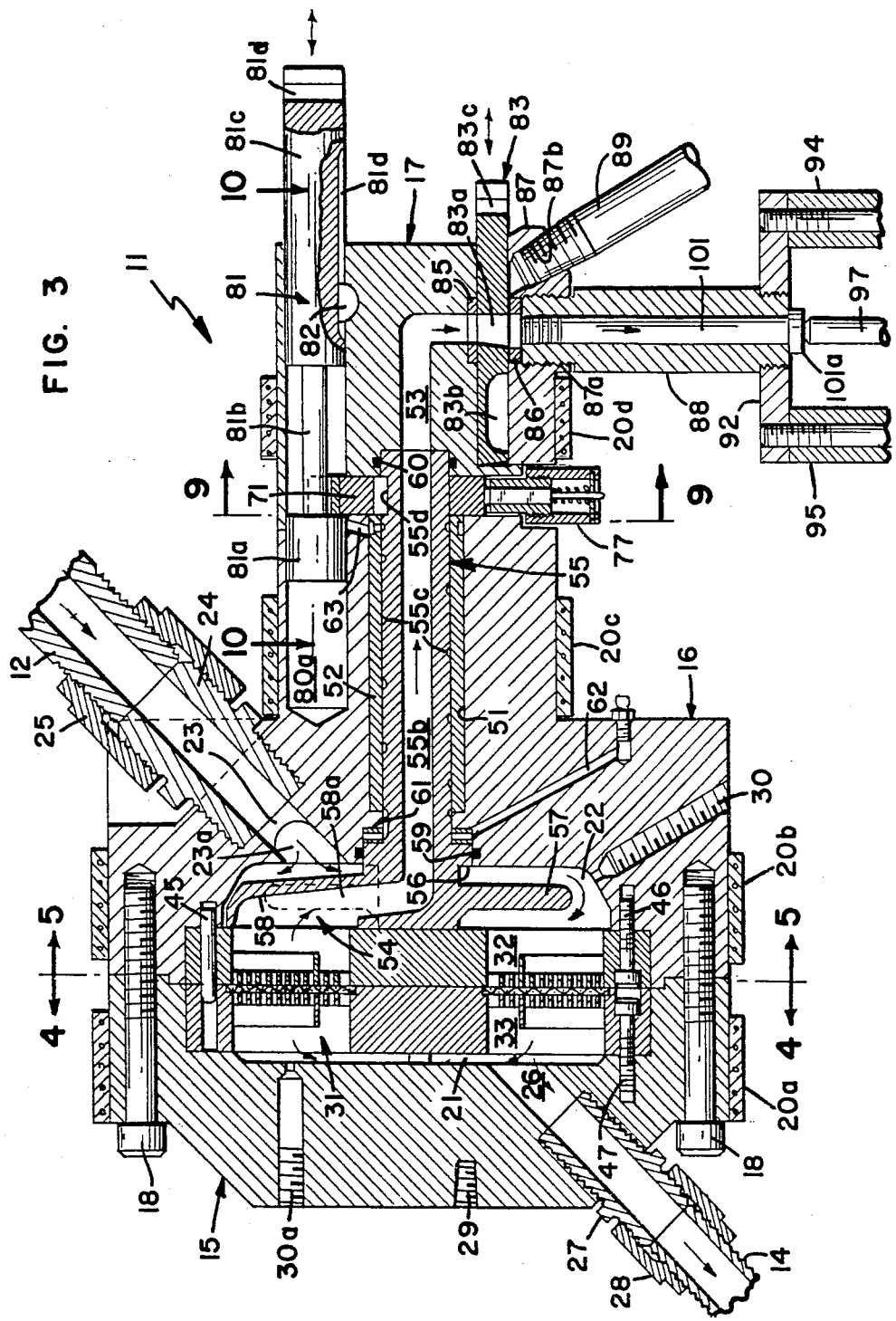
FIG. 3 is a fragmentary sectional view of the filtering apparatus taken along the line 3—3 of FIG. 2.

With initial reference to FIG. 1, filtering apparatus embodying the invention is represented generally by the numeral 11. Apparatus 11 receives unfiltered plastic under significant pressure through an inlet pipe 12 from an extruder screw 13 of conventional construction. The filtered plastic is discharged from the apparatus 11 through an outlet pipe 14 to an extruder die (not shown). Although disclosed in connection with plastic extruding apparatus, the filtering apparatus 11 is capable of being used with plastic injection molding apparatus or with any other type of fluid in which a continuous, uninterrupted flow is required.

The body of filtering apparatus 11 comprises an assembly of block components configured to mate with each other and to receive various operative components of the apparatus. With additional reference to FIG. 3, an end block 15 (on the left end as viewed in FIGS. 1 and 3) is of cylindrical configuration and mates with a middle block 16. Middle block 16 conforms to the diameter of end block 15 but steps down to a smaller diameter to receive an end block 17.

With continued reference to FIGS. 1 and 3 and additional reference to FIG. 2, middle block 16 is sealably secured to end block 15 with a plurality of mounting bolts 18 that are equiangularly spaced around its periphery. In the preferred embodiment, 24 bolts are included, which corresponds to the number of segmented openings and filter screens as described in further detail below.

Circular chambers 21, 22 are respectively formed in blocks 15, 16 in axial facing position, the chamber 22 serving as an inlet chamber and the chamber 21 serving as an outlet chamber. An inlet passage 23 leads from chamber 22 to a threaded inlet nipple 24 secured to inlet pipe 12 with a coupler 25.

End block 17 is secured to middle block 16 by a plurality of bolts 19 shown only in FIG. 9.

Heater bands 20a, 20b, 20c and 20d encircle the block assembly to maintain the apparatus 11 at a constant temperature that is sufficiently high to insure proper flow of the plastic melt but low enough to avoid degradation of the plastic.

An outlet passage 26 leads from outlet chamber 21 through a threaded nipple 27 to the outlet pipe 14. Nipple 27 and outlet pipe 14 are joined by a coupler 28.

It will be observed that the angle of inlet pipe 12 relative to the filtering apparatus 11 is the same as that of the outlet pipe 14, and that the inlet and outlet pipes 12, 14 are also disposed in coaxial alignment. This simplifies installation of the filtering apparatus and insures a straight flow-through of the plastic from the unfiltered to the filtered stage.

With continued reference to FIG. 3, a suitable threaded bore 30 is angularly formed in the middle block 16 in communication with inlet chamber 22. Threaded bore 30 is adapted to receive a pressure sensor or gauge that enables the operator to determine pressure in the inlet chamber 22. Similarly, a threaded bore 30a is formed in the end block 15 to receive a suitable pressure gauge or sensor that enables the operator to determine the pressure in outlet chamber 21. A dead ended threaded bore 29 is formed in the end block 15 to receive a thermocouple or similar temperature sensor to determine the operating temperature of the unit.

With reference to FIG. 11, which discloses an alternative outlet configuration, an end block 15' is formed with a central, axially aligned outlet passage (not shown) to which a threaded outlet nipple 27' is connected. A coupling 28' joins the outlet nipple 27' with the outlet pipe 14'.

This configuration enables the user to discharge filtered plastic into an extruder or plastic injection molding machine in direct alignment with the housing of filter apparatus 11.

A filter assembly bearing the general reference numeral 31 is disposed between the inlet and outlet chambers 22, 21 and serves to filter the plastic flow in a highly efficient manner. The components of the filter assembly 31 are shown in detail in FIGS. 3-8, to which reference is made.

Figure 5:
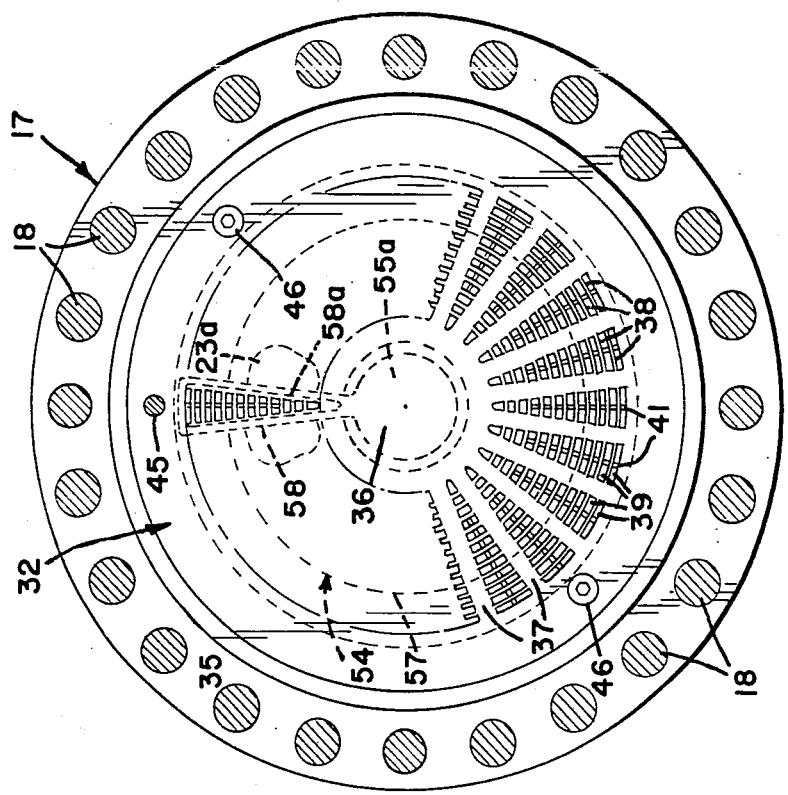
FIG. 5 is an enlarged end view of a segmented trapper plate similar in construction to the segmented breaker plate.
Figure 4:
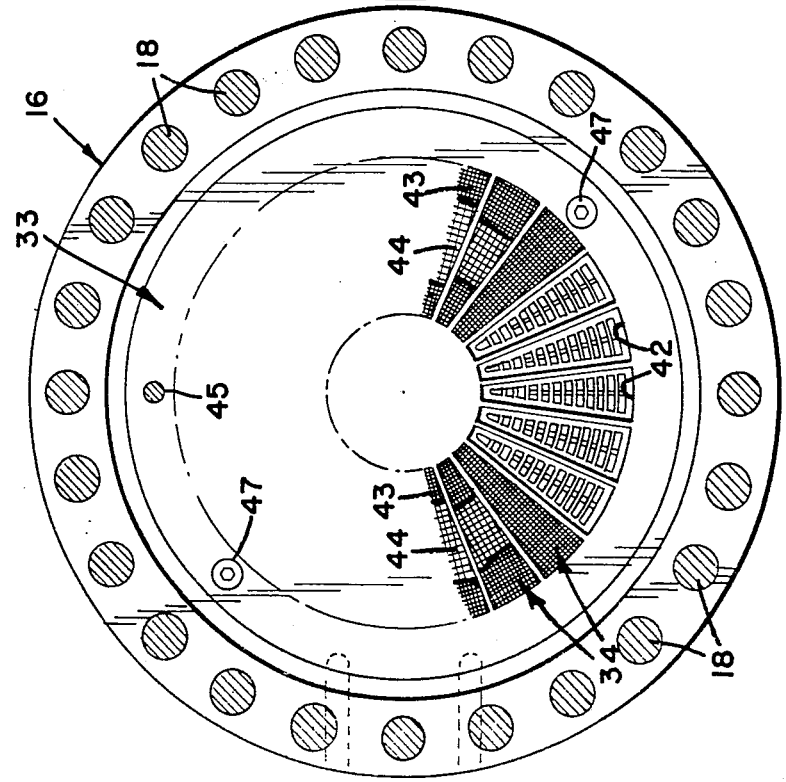
FIG. 4 is an enlarged end view of a circular, segmented breaker plate with individual segmented filter screens disposed therein.

With particular reference to FIGS. 4 and 5, the filter assembly 31 comprises a cylindrical or disk-shaped trap plate 32 (FIG. 5) and a breaker plate 33 (FIG. 4) between which are disposed a plurality of filter screen assemblies 34. With one exception, as noted below, the trap and breaker plates 32, 33 are of identical construction and are disposed in face-to-face relation with the filter screen assemblies 34 sandwiched therebetween.

With reference to FIGS. 5, 6 and 8, the trap plate 32 comprises an annular peripheral portion or rim 35 and a central hub 36 between which a plurality of ribs 37 extend radially. The ribs 37 are equiangularly spaced and extend completely from one face of the trapper plate 32 to the other. As such, they define a plurality of large openings therebetween that extend entirely through the trapper plate, each of which takes the form of a segment of a circle; i.e., is of generally triangular configuration.

Extending transversely between the ribs 37 are a plurality of thin bars 38 that subdivide the segmented opening into a plurality of passages 39. As best shown in FIG. 8, the thin bars 38 are equidistantly spaced within the segmented opening, and each is formed on a radius and is thus slightly arcuate in shape. With reference to FIG. 6, the axial depth of the thin bars 38 is less than the complete thickness of the trapper plate 32, beginning at the front face (the left face as viewed in FIG. 6) and extending only partially toward the rear face. One of the thin bars 38, designated 38a in FIGS. 6 and 8, extends a greater axial distance from the front face of trapper plate 32 than the other thin bars 38. A thin rib 41 extends radially outward from the bar 38a to the rim 35 in support relation to the back edges of the thin bars 38 it traverses. These structural components 38a, 41 provide the structural support necessary to withstand the extremely high pressures used in plastic extrusion, which normally reach 2,000-6,000 psi, upstream of the filter.

As constructed, the trap plate 32 presents to incoming plastic a plurality of segmented, triangular pockets 32a each of which includes passages 39 that are sized to remove larger contaminants on the upstream side (the right-hand side as viewed in FIG. 6). These larger contaminants are purged periodically in a manner described in further detail below.

With reference to FIGS. 4, 6 and 8, the breaker plate 33 is of identical construction to the trap plate 32 with the exception that a recess 42 of segmented, triangular configuration is formed on the upstream side (righthand side as viewed in FIG. 6) of each of the triangular pockets 33a.

Each recess 42 receives one of the segmented filter screen assemblies 34. With reference to FIGS. 4 and 6, each of the filter screen assemblies 34 comprises a fine screen 43 and a coarse screen 44. The fine screen 43 is disposed on the upstream side, and in the preferred embodiment consists of a Dutch weave construction. The coarse screen 44 is disposed on the downstream side, and in the preferred embodiment comprises a conventional basket weave. Both the screens 43, 44 are preferably formed from stainless steel wire.

As seen in FIG. 6, the mesh of fine screen 43 produces filtration openings that are much smaller than those of the coarse screen 44, and the filtration openings of both screens 43, 44 are considerably less than the passages 39. As such, the passages 39 function to remove larger contaminants from the flow before it reaches the fine screen 43, and the coarse screen 44 provides backing support to the downstream side of the fine screen 43 as the melted plastic is filtered under significantly high pressures.

With reference to FIGS. 3-5, the trapper and breaker plates 32, 33 are held in proper registration by a registration pin 45 disposed in alignable bores in the respective plates 32, 33. Further, the trap plate 32 is screwed into the middle block 16 with screws 46 and the breaker plate 33 is screwed into the end block 15 with screws 47, and these also serve to hold the respective plates in proper registration. The filter assembly 31 as a whole is locked into place within the chambers 21, 22 by virtue of a circular recess formed in the blocks 15, 16 coupled with the clamping force of the bolts 18.

With reference to FIG. 3, an axially extending bore 51 is formed entirely through the middle block 16, opening into the inlet chamber 22. The bore is stepped to receive an elongated sleeve bearing 52. A bore 53 extends for a short distance into end block 17 and then turns downward to define a contaminant discharge passage.

Immediately adjacent the inlet chamber 22, axial bore 51 is stepped to a larger diameter for a purpose described below.

A reverse flow contaminant collector is represented generally by the numeral 54. As described in further detail below, the contaminant collector 54 is configured to occupy and rotate in the inlet chamber 21 inside the bore of sleeve 52 and axial bore 53.

Figure 12:
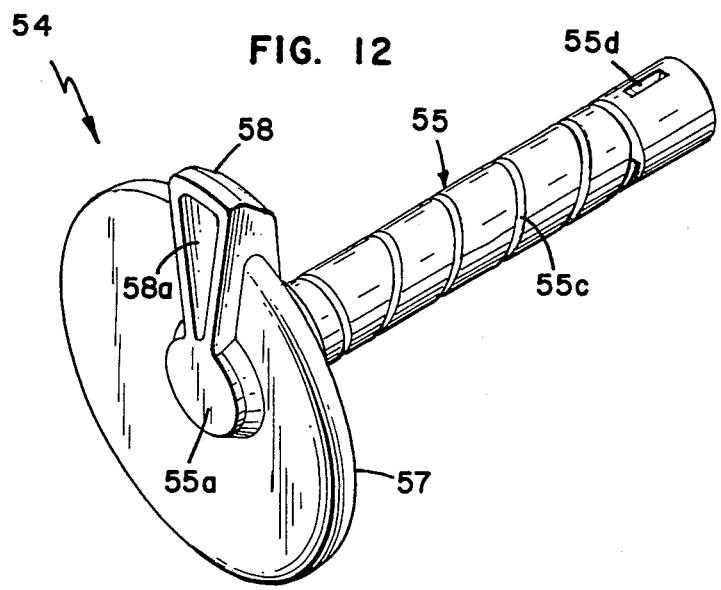
FIG. 12 is a perspective view of a reverse flow contaminant collector used in the inventive filtering apparatus.
Figure 13:
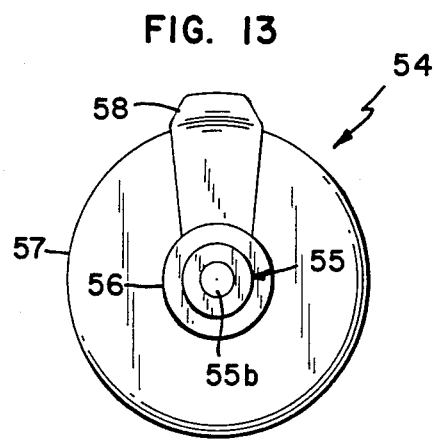
FIG. 13 is an end view of the contaminant collector as viewed from the end opposite that shown in FIG. 12.

As best shown in the perspective view of FIG. 12, contaminant collector 54 comprises a thick longitudinal tube 55 that is rotatably disposed in the sleeve 52 and bore 53. The tube 55 projects rearwardly from a slightly enlarged collar 56 and a large diameter, thin circular plate 57. Integrally formed with the circular plate 57 is a collector head 58 that is generally triangularly shaped and occupies a generally triangular segment of plate 57. The collector head 58 extends radially outward from a closed end 55a of tube 55.

With reference to FIG. 12, collector head 58 defines a triangularly shaped inlet 58a that conforms in size and shape to and is selectively registrable with each of the segmented openings in trap plate 32. As shown in FIG. 3, the inlet 58a communicates with an axial bore 55b of the tube 55 that is aligned with the discharge passage 53.

It is intended that the contaminant collector 54 rotate in stepped fashion for registration with each of the triangular pockets 32a of the trap plate 32. This is facilitated by the sleeve bearing 52 and the inclusion of annular Teflon seals 59, 60 disposed at each end of the tube 55. This rotation is also facilitated through the use of a roller thrust bearing 61 that is disposed in the enlarged step of bore 51 for axial engagement by the collar 56.

A grease inlet passage 62 is formed in metal block 16, leading to the roller thrust bearing 61. The thrust bearing 61 in turn communicates with a spiral groove 55c formed in the outer surface of tube 55, insuring that high temperature grease will be continuously supplied to moving surfaces. The spiral groove 55c communicates with a grease outlet passage 63 leading to a further area requiring lubrication as described in further detail below.

With continued reference to FIG. 3, it will be observed that the back face of collector head 58 is spaced from the opposed front face of inlet chamber 22. Even so, when the collector head 58 is in the position shown in FIGS. 3, 5, it partially obstructs the inlet passage 23 leading from inlet pipe 12. For this reason, the inlet passage 23 is flared laterally as shown at 23a to enable incoming plastic to flow around the collector head 58.

Also as shown in FIG. 3, the diameter of circular plate 57 is somewhat less than the overall diameter of the chamber 22. The clearance between the plate 57 and wall of chamber 22 defines an annular passageway for the incoming plastic flow. The purpose of plate 57 is to spread the incoming plastic, causing it to flow uniformly through the filter assembly 31 and insuring that all plastic travels the same distance notwithstanding the route it takes. The result is optimum filtration of the plastic.

As will be described in further detail below, the contaminant discharge passage 53 is closed during part of the filtering operation of apparatus 11. During this time, the entire flow of plastic is from the inlet pipe 12 and inlet passage 23 around the circular spreader plate 57 and through filter assembly 31, with a discharge of filtered plastic through the outlet passage 26.

During the filter purging operation, this forward flow continues. However, when the contaminant discharge passage 53 is opened as described below, a pressure differential will be created between the outlet chamber 21 and discharge passage 53 to create a reverse flow of filtered plastic through the pockets 33a, 32a and filter screen assembly 34 disposed in registration with the collector head 58 at that time, and thereafter through the bore 55b and discharge passage 53.

In the preferred embodiment, the reverse flow through each of the segments of filter assembly 31 is in a series of pulses at a pressure that is somewhat lower in pressure than the pressure exerted by the incoming unfiltered plastic passing through the filter assembly 31 in the forward direction. In the preferred embodiment, four such pulses are generated, each of which has an endurance of approximately five seconds. A typical forward operating pressure at the filter screen assembly is 2,000–6,000 psi, whereas the reverse flow purge pressure would be on the order of 500 psi. The reverse flow is controlled by a valving mechanism in the discharge passage 53 which is described in detail below.

The valving function is coupled with the operation of a mechanism for rotatably indexing the contaminant collector 54 so that the collector head 58 registers with each of the triangular pockets 32a in a sequential stepping manner. After registration, the valving function causes reverse flow under several pulses to release the contaminants captured in the registered pocket 32a and associated filter screen assembly 34. The valve is then closed and the collector head 58 is indexed to the next pocket 32a, and the valving cycle is repeated. The result is sequential purging of each of the pockets 32a and associated filter screen assembly 34, and a stepped, discrete flow of contaminants in a very small volume of plastic through the axial bore 55b and contaminant discharge passage 53.

The indexing and valving mechanism is shown in FIGS. 1, 3, 9 and 10. With specific reference to FIGS. 3 and 9, an annular chamber 71 is defined between the middle block 16 and end block 17 in concentric, surrounding relation to the axial bore 51. Disposed in this annular chamber is an index ring 72 and an annular index wheel 73. Index wheel 73 is disposed within the index ring 72, and both are concentric with the axial bore 51 and axial tube 55 of the contaminant collector 54. A small keyway 55d is formed in the cylindrical surface of tube 55 proximate its outlet end, and a corresponding notch 73a is formed in the inner surface of index wheel 73. A key 74 locks the tube 55 and index wheel 73 for rotation together.

A plurality of equiangularly spaced teeth 73b are formed in the outer periphery of index wheel 73. The teeth 73b do not impede rotation of the index wheel 73 relative to the index ring 72.

Index ring 72 is formed with a threaded radial projection 72a which extends into an arcuate recess 75 in the bottom of apparatus 11 between middle block 16 and end block 17. A cross sectionally rectangular or square bore 72b extends radially through the entire thickness of the index ring 72 and its radial projection 72a and slidably receives a similarly shaped index pin 76. A threaded cap 77 retains a compression spring 78 so that the pin 76 is normally urged radially inward into engagement with the index wheel 73. The inner end of pin 76 is beveled to abutably engage the teeth 73b, preventing relative rotation of the index wheel 73 in the clockwise direction as viewed in FIG. 9.

As constructed, the toothed index wheel is caused to rotate in a single direction (counterclockwise in FIG. 9). The index ring 72 is constrained to reciprocal movement through a relatively small arc of travel, as defined by the arcuate recess 75, and it is this movement which moves the toothed index wheel 73 in the counterclockwise direction one step at a time.

This reciprocal arcuate movement of the index ring 72 is caused by a mechanism shown in FIGS. 3, 9 and 10. With specific reference to FIGS. 3 and 10, a piston represented generally by the numeral 81 comprises solid cylindrical heads 81a, 81c interconnected by a neck 81b. The heads 81a, 81c are slidably disposed in cylindrical bores 80a, 80c, respectively, which are formed in the end blocks 16, 17. Heads 81a, 81c are of identical diameter, although head 81c has a considerably greater axial dimension.

With reference to FIG. 3, the grease outlet passage 63 communicates with the bore 80a to provide lubricant to the piston head 81a.

Also with reference to FIG. 3, a longitudinal keyway 81d is formed in the piston 81d, and a key 82 disposed in an appropriate slot in the end block 17 projects into the keyway 81d, permitting the piston 81 to reciprocate longitudinally, while precluding rotational or twisting movement.

The neck 81b is partially rounded in cross section, as shown in FIG. 9, but is considerably smaller in cross sectional size than the heads 81a, 81c and extends angularly from the edge of the head 81a to the opposite edge of the head 81c. In the preferred embodiment, the neck 81b subtends an angle of approximately 15° relative to the longitudinal axes of the heads 81a, 81c.

With continued reference to FIGS. 3, 9 and 10, a semicircular notch 72c is formed in the outer peripheral edge of index ring 72 opposite the bore 72b in a position to receive the neck 81b. As best shown in FIG. 10, because the neck 81b subtends an angle of 15° relative to the heads 81a, 81c, the notch 72c likewise subtends an angle of 15° as it traverses from one face of the ring 73 to the other to accommodate the piston neck 81b.

As constructed, forward movement of the piston heads 81a, 81c (right to left movement when viewed in FIGS. 3 and 10) will effect limited rotational movement of the index ring 72, in the counterclockwise direction as viewed in FIG. 9, for a distance which corresponds generally to the distance between teeth 73b of the index wheel 73. Similarly, rearward movement of the piston 81 effects limited rotational movement of the index ring 72 in the opposite direction, which is clockwise as viewed in FIG. 9.

Because the index ring 72 carries the index pin, it will be seen that the forward thrust of piston 81 causes the index ring 72 to move in a limited manner in the counterclockwise direction as shown in FIG. 9, carrying the index wheel 73 with it by virtue of the abutting relationship of the index pin 76 with the side of the engaged tooth 73b. As the piston 81 is withdrawn, the index ring 72 moves clockwise a limited distance, giving rise to an escapment movement of the index pin 76 relative to the adjacent tooth 73b. This is due to the beveled end of the pin 76 and capability of the pin 76 to be moved radially outward against the bias of compression spring 78. The rotational distance through which the index wheel 73 moves during this cycle corresponds to the rotational distance between the triangular pockets 32a in the trap plate 32. Accordingly, for each forward stroke of the piston 81, the collector head 58 steps forward to the next triangular pocket 32a, and each rearward stroke prepares the index ring 72 for the next stepping movement.

Valving of the contaminant discharge passage 53 occurs simultaneously through movement of a valve plate 83 that is also slidably disposed in a bore 84 of rectangular cross section formed in the end block 17. Rectangular bore 84 is disposed in parallel relation to the bores 80a, 80c and traverses the contaminant discharge passage. Annular seals 85, 86 are disposed on opposite sides of the valve plate 83 for sealing engagement as it reciprocates.

As shown in FIG. 3, the contaminant discharge passage 53 turns 90° and extends radially outward through a small discharge block 87 that is secured to end block 17 through means not shown. Block 87 is formed with a first threaded bore 87a to which a first threaded contaminant discharge pipe 88 is connected. As shown in FIG. 3, the discharge pipe 88 is disposed in parallel alignment with the radially extending portion of discharge passage 53.

Discharge block 87 has a second threaded bore 87b that also communicates with the bore 84 to which a second discharge pipe 89 is connected. Threaded bore 87b and discharge pipe 89 are offset from the discharge portion of discharge passage 53 and angled relative thereto.

With reference to FIGS. 1-3, the first discharge pipe 88 is threadably secured to a frame assembly 91 comprising spaced end plates 92, 93 interconnected by longitudinal connector rods 94, 95. A pneumatic cylinder 96 is threadably mounted to the center of end plate 93, including an actuator rod 97 with a length adjustment 98. Suitable pneumatic connections 99, 100 are mounted to the pneumatic cylinder 96 on opposite sides of its internal piston, to which the actuator rod 97 is connected.

A plunger 101 is slidably disposed in the discharge pipe 88. Plunger 101 includes a stop 101a engagable with the bottom face of end plate 92, and the length of plunger 101 is chosen so that, with the stop 101a engaging the plate 92, the extreme end of plunger 101 is just adjacent the bore 84.

With the actuator rod 97 fully extended and adjusted as shown in FIG. 3, the plunger 101 is forced to the furthest position as shown in FIG. 3. Other positions of the plunger 101 may be chosen with the actuator rod 97 fully extended through adjustments of the length adjustment 98.

The valve plate 83 is formed with a straight bore 83a sized to establish full communication between the discharge passage 53 and the discharge tube 88 with the valve plate 83 in the position shown in FIG. 3. Valve plate 83 is also formed with a transfer groove 83b the width of which permits communication between the discharge pipes 88, 89 (FIG. 3A).

With the valve plate 83 disposed in the position of FIG. 3A, the discharge passage 53 is blocked, and this precludes reverse flow through the collector head 58 and passage 55b. Reverse purge flow is effected, however, when the valve plate 83 is moved forward to the position shown in FIG. 3, at which time the purge flow with dislodged contaminants moves through the contaminant passage 53 and bore 83a. At this point, the purge flow engages the plunger 101 and drives it against the air subject to compression in pneumatic cylinder 96. The extent to which and rate at which the plunger 101 moves is a function of pressure in the pneumatic cylinder 96.

After the plunger 101 reaches its farthest position against the bias of the pneumatic cylinder 96, the valve plate 83 is reciprocated rearwardly to the point shown in FIG. 3A, at which time the discharge pipes 88, 89 are placed in fluid communication. The discharge pipe 89 is connected to atmosphere. Consequently, at this time, the pneumatic cylinder 96 is able to expand, forcing the plunger 101 upward and discharging a slug of contaminant filled plastic from the discharge pipe 88 through the transfer passage 83b and discharge pipe 89 into a suitable waste receptacle.

With reference to FIG. 1, fluid cylinders 102, 103 (which may be either pneumatic or hydraulic) are provided to respectively actuate the piston 81 and valve plate 83. Both of the fluid cylinders 102, 103 are mounted to a mounting plate 104 that is spaced from and secured to the end block 17 through a plurality of mounting posts 105.

Cylinder 102 includes fluid couplings 102a, 102b that are connected to a fluid source to conventionally extend and retract an actuator rod 106. With additional reference to FIG. 10, the extreme end of piston 81 is formed with a T-shaped slot 81d, and the extreme end of actuator 106 is formed with a T-shaped projection 106a that may be inserted laterally into the T-shaped slot 81d to impart reciprocating movement to the piston 81.

Similarly, fluid cylinder 103 includes fluid couplings 103a, 103b that serve to extend and retract an actuator rod 107 the extreme end of which has a T-shaped projectuon 107b. The valve plate 83 similarly has a T-shaped slot 83c that interlocks with the projection 107b.

The fluid cylinders 102, 103 are independently actuated through the use of a suitable timing means not shown in a manner that accomplishes the function described in detail below.

During normal filter operation of the apparatus 11, the unfiltered plastic enters from inlet pipe 12 through the flared inlet passage 23, around the circular spreader plate 57, through all but one of the triangular pockets 32a of trap plate 32, the segmented filter screen assemblies 34, the triangular pockets 33a of breaker plate 33 and out the outlet pipe 14. Large contaminants are filtered by the thin bars 38 as the plastic flows through the passages 39, and are retained in the deep triangular pockets 32a. The plastic flowing into any given pocket 32a and through the associated thin bars 38 is thereafter constrained to flow through the associated filter screen assembly 34, and thereafter through the facing pocket 33a from the breaker plate 33. During this process, the fine screen 43 removes all contaminants larger than its mesh size, which in the preferred embodiment is 14×88. Because of the size and construction of fine screen 43, the contaminants filtered from the flow remain on the surface of the screen and do not flow into and become embedded into the screen. It is also essential that the fine Dutch weave filter screen 43 be strong enough to bridge the openings between thin bars 38 under the influence of the significant pressure at which the unit operates.

The coarse basketweave screen 44 is much heavier in wire size and coarser in mesh size than the fine screen (16×0.028 inches in the preferred embodiment), and acts as a support screen to the fine screen 43 during the filtration process. In addition, during filtration it permits the filtered plastic to flow laterally within its mesh as it seeks to pass around the thin bars of the breaker plate 33.

In the reverse direction, during which a selected fine screen 43 is purged of contaminants, the coarse screen 44 distributes the back flush flow uniformly through the associated fine screen 43 by permitting lateral flow within its mesh.

Also during the purging operation, the fact that triangular pockets 32a, 33a exist on each side of each filter screen assembly 34 means that a certain volume of flow will be channeled into the appropriate pocket of breaker plate 33, all of which flow will be exerted on the associated filter screen assembly 34 in a reverse direction. Stated otherwise, with prior art devices which utilize nonsegmented breaker plates, the reverse purge flow may move laterally around a contaminated filter screen rather than through it for purging purposes. Such flow is not possible with the inventive structural arrangement, which insures that the filter screen assembly 34 under purge will receive the necessary flow of purging (filtered) plastic.

Initiation and termination of the reverse purge flow is controlled by the fluid cylinder 103, which determines the position of the sliding valve plate 83. Which of the segmented filter assemblies 34 is purged is determined by fluid cylinder 102, which controls reciprocation of the piston 81 and the related mechanism that advances collector 54. As indicated above, the fluid cylinders 102, 103 are extended and retracted pneumatically or hydraulically by valves controlled by a suitable timing mechanism, neither of which is shown.

With fluid cylinder 103 retracted, the valve plate 83 is in the position shown in FIG. 3A. In this position, the contaminant discharge passage 53 is blocked at its outlet, preventing reverse flow through the filter assembly 34 in communication with collector 54. Extension of the fluid cylinder 103 moves the valve plate 83 to the position shown in FIG. 3 and establishes communication between the contaminant discharge passage 53 and the discharge tube 88. As a consequence, reverse purge flow is caused and the purging process is initiated for the filter screen assembly 34 in registration with the collector 54.

Preferably, the purge flow is pulsed several times (four times in the preferred embodiment) to insure that each filter screen assembly 34 is completely cleaned. This pulsing operation is controlled by reciprocating the fluid cylinder 103 and valve plate 83 to open and close communication between the contaminant discharge passage 53 and discharge tube 88.

During each pulse, the contaminant-filled purge flow passes through collector head 58, bore 55b and discharge passage 53 and into the first discharge pipe 88 against the pneumatic bias of plunger 101. This controls the precise amount of purging plastic flowing through each of the filter screen assemblies 34, eliminating waste that would otherwise occur if the contaminant discharge passage were simply opened to atmosphere.

In the preferred embodiment, each of the four pulses results in a discharge of approximately eight grams of contaminant-filled plastic, which corresponds to the volume of discharge tube 88 with the plunger 101 fully extended out of the tube 88. When this volume is reached, the fluid cylinder 103 is retracted, moving the valve plate 83 to the position shown in FIG. 3A. In this position, the transfer groove 83b establishes communication between discharge tubes 88, 89, and the pneumatic pressure built up in pneumatic cylinder 96 forces the slug of contaminant-filled plastic from discharge tube 88 into discharge tube 89 and thereafter into a suitable waste receptacle.

The dimensions of the various purge flow passages and pressure established within the pneumatic cylinder 96 are chosen so that the pressure of the purge flow is reduced as it moves through the selected screen assembly 14. A lesser pressure is preferred because the contaminants are retained on the surface of the fine screen 43, and a lesser pressure is required to purge them. The same holds true for the larger contaminants, which are retained in each of the deep triangular pockets 32a on the face of the thin bars 38.

The several pockets 32a are purged sequentially, with the collector 54 stepping forward to the next pocket after the four pulses of reverse purge flow have been completed for the previous pocket.

With the collector head 58 in a given position overlying one of the triangular collector pockets 32a, pneumatic cylinder 102 is extended, moving the piston 81 from the position shown in FIG. 3 to the left. The neck 81b, due to its angled configuration, moves the index ring 72 in a counterclockwise direction as viewed in FIG. 9, which in turn rotates the index wheel 73 in a counterclockwise direction because of the engagement of index pin 76 with one of the teeth 73b. Because the tube 55 is mechanically secured to the index wheel 73, it is stepped forward to the next triangular collector pocket 32a. The fluid cylinder 102 is thereafter retracted, returning the piston 81 to the position shown in FIG. 3. This moves index ring 72, carrying the index pin 76 with it. However, because of the beveled configuration of the pin 76 and teeth 73b, coupled with the retracting capability of the pin 76 against the compression spring 78, the pin 76 moves arcuately to the next tooth 73b in an escapement manner, and is thereafter ready to advance the collector head 58 on the next stroking of cylinder 102.

The stroking of cylinders 102, 103 is in a timed sequence to accomplish the functions described above.

As constructed, the inventive filtering apparatus 11 is capable of providing a continuous supply of filtered plastic to an extrusion die, with periodic purging of each of the filter assemblies 34 without interruption. Because purging occurs on a periodic timed basis, it prevents the excessive buildup of contaminants and avoids the problem of clogged filters, rather than waiting until the filters become clogged. As such, the inventive filtering apparatus not only will operate continuously, but also the filter screen assemblies themselves will have a greater life based on this preventive maintenance.

What is claimed is:

1. Apparatus for filtering a flow of melted plastic, comprising:
   housing means;
   filter means in the housing means having upstream and downstream sides;
   inlet means for supplying unfiltered plastic to the upstream side of the filter means;
   first outlet means communicating with the downstream side of the filter means for discharging filtered plastic;
   purging means for causing a reverse purge flow of a portion of the filtrate through the filtering means from the downstream to the upstream side thereof to purge contaminants therefrom;
   second outlet means for discharging the contaminant-filled purge flow from the housing;
   purge chamber means defining a chamber for receiving a finite quantity of the contaminant-filled purge flow from the purging means;
   discharge means associated with the purge chamber means for causing said finite quantity to be discharged from the purge chamber means into said second outlet;
   and valve means for selectively establishing exclusive communication between the purging means and the purge chamber means, and between the purge chamber means and the second outlet means.

2. The apparatus defined by claim 1, wherein the discharge means comprises:
   piston means reciprocable within the chamber between extended and retracted positions, the retracted position establishing the maximum volume of said chamber, and the extended position reducing the chamber volume to a minimum and causing material in said chamber to be discharged therefrom;
   and actuating means for effecting reciprocation of the piston means between said extended and retracted positions.

3. The apparatus defined by claim 2, wherein said chamber is cylindrical and the piston means comprises a rod slidably disposed in the chamber.

4. The apparatus defined by claim 3, which further comprises means for adjusting the positions of the rod within the cylindrical chamber.

5. The apparatus defined by claim 2, wherein the actuating means comprises a pneumatic actuator.

6. The apparatus defined by claim 5, which further comprises means for normally operating the pneumatic actuator at a predetermined bias pressure chosen to permit the purge flow to enter the chamber and move the piston means to its retracted positiion thereagainst, and which pressure increases with retracted movement of the piston means, whereby movement of the valve means to establish communication between the purge chamber and second outlet means causes the piston means to evacuate the purge chamber.

7. The apparatus defined by claim 2, wherein:
   the purging means comprises a purge flow passage means;
   the purge chamber means comprises a single inlet/outlet disposed in alignment with said purge flow passage;
   the second outlet is disposed proximate the inlet/outlet of the purge chamber means;
   and the valve means is movable between first and second positions, and comprises means defining an opening therethrough for establishing communication between the purge flow passage and the purge chamber means inlet/outlet in said first position, and further comprising a transfer groove means for establishing communication between the purge chamber means inlet/outlet and the second outlet in the second position.

8. The apparatus defined by claim 7, wherein the valve means comprises:
   a slide valve member reciprocable between said first and second positions;
   and actuator means for reciprocating the slide valve between said first and second positions.

9. The apparatus defined by claim 7, wherein the valve means includes means for blocking communication between the purge flow passage and the purge chamber means inlet/outlet in said second position.

10. A segmented filter assembly for filtering a flow of melted plastic, comprising:
    a trap plate having means defining a plurality of openings therethrough arranged in a generally circular array, each opening defining a segment of a circle, and a plurality of spaced bars disposed in and traversing each segmented opening to define a plurality of passages through which larger contaminants cannot pass;
    a breaker plate having means defining a like plurality of openings of segmented circular configuration registrable with the openings of the trap plate, and further comprising a plurality of spaced bars in each segmented opening to define a plurality of passages therethrough;
    and a plurality of filter means each having a segmented configuration corresponding in size to the segmented openings of the trap and breaker plates and disposed between opposed registering segmented openings of the trap and breaker plates.

11. The filter assembly defined by claim 10, wherein the filter means comprises a first finer screen segment and a second coarser screen segment disposed in face-to-face relation with the first screen segment disposed adjacent the trap plate and the second screen segment disposed adjacent the breaker plate.

12. The filter assembly defined by claim 10, wherein the trap plate is of predetermined thickness and defines upstream and downstream faces, and each of said spaced bars has a thickness less than the thickness of the trap plate and is disposed proximate the downstream side thereof, whereby pockets are defined within each of said openings upstream of said spaced bars.

13. The filter assembly defined by claim 12, wherein the breaker plate is of predetermined thickness and defines upstream and downstream faces, and each of said spaced bars has a thickness less than the thickness of the breaker plate and is disposed proximate the upstream side thereof, whereby pockets are defined within each of said openings downstream of said spaced bars.

14. The filter assembly defined by claim 13, which further comprises means for retaining each of the filter means between registering openings in the trap and breaker plates.

15. The filter assembly defined by claim 14, wherein the retaining means comprises a plurality of shallow recesses formed in one of said trap and breaker plates, each of said shallow recesses being disposed between registering individual openings of the trap and breaker plates.

16. The filter assembly defined by claim 12, wherein each of said filter means comprises a first finer screen and a second coarser screen disposed in face-to-face relation with the first screen disposed adjacent the trap plate and the second screen disposed adjacent the breaker plate.

17. The filter assembly defined by claim 12, wherein the spaced bars of the trap plate are equidistantly spaced, each being arcuately formed and disposed a predetermined radial distance from the center of said circular array.

18. The filter assembly defined by claim 17, wherein the spaced bars of the breaker plate are equidistantly spaced, each being arcuately formed and disposed a predetermined radial distance from the center of said circular array.

19. Apparatus for filtering a flow of melted plastic, comprising:
a housing, with a filter assembly disposed in the housing having upstream and downstream sides;
an inlet for supplying unfiltered plastic to the upstream side of the filter assembly;
a filtrate outlet communicating with the downstream side of the filter assembly for discharging filtrate;
the filter assembly comprising
a circular trap plate having means defining a plurality of generally triangular openings therethrough disposed in a circular array;
means in said trap plate subdividing each of said openings into a plurality of smaller passages sized so that larger contaminants cannot pass therethrough, the subdividing means being disposed in the base of the associated opening so that the opening defines a collector pocket for larger contaminants;
a circular breaker plate having means defining a like number of generally triangular openings therethrough and disposed in a circular array so that the openings of the trap and breaker plates may be disposed in registration;
a plurality of filter means each being of generally triangular configuration and corresponding in size to the trapper and breaker plate openings, each filter means being disposed between opposed registering openings of the trap and breaker plates;
collector head means disposed in the housing for rotational movement relative to the trap plate, the collector head means being configured for discrete communication with each of said trap plate collector pockets;
first drive means for moving the collector head means through a series of stationary positions in stepped sequence, each stationary position corresponding to a collector pocket with which the collector head means is in registration;
a contaminant discharge passage means disposed in the housing means in communication with the collector head means;
and valve means for selectively blocking and opening the discharge passage.

20. The apparatus defined by claim 19, which further comprises:
chamber means defining a purge chamber for receiving a predetermined volume of contaminants from said discharge passage;
a contaminant discharge outlet means;
and discharge means associated with the purge chamber for causing said predetermined volume to be discharged from the purge chamber into the discharge outlet;
the valve means being constructed and arranged to selectively establish exclusive communication between the discharge passage and the purge chamber in a first position, and between the purge chamber and discharge outlet in a second position.

21. The apparatus defined by claim 19, wherein the circular breaker plate further comprises means for subdividing its generally triangular openings into a plurality of smaller passages, the subdividing means being disposed in the base of the opening.

22. The apparatus defined by claim 21, which further comprises means for retaining each of said filter means between registering openings in the trap and breaker plates.

23. The apparatus defined by claim 22, wherein the retaining means comprises a plurality of shallow recesses formed in one of said trap and breaker plates, each of said shallow recesses being disposed between registering individual openings of the trap and breaker plates.

24. The apparatus defined by claim 23, wherein each of the filter means comprises a first finer screen and a second coarser screen disposed in face-to-face relation with the first screen disposed adjacent the trap plate and the second screen disposed adjacent the breaker plate.

* * * * *